No. 762,950. PATENTED JUNE 21, 1904.
J. SHERWOOD.
ANCHOR FOR DREDGING MACHINES.
APPLICATION FILED APR. 28, 1903.
NO MODEL.

Fig. 1.
Fig. 2.
Fig. 3.
Fig. 4.

Witnesses
Sidney Alexander,
V. H. Cudwell, Jr.

Inventor
Jerry Sherwood
by L. A. Gourick
Attorney

No. 762,950. Patented June 21, 1904.

UNITED STATES PATENT OFFICE.

JERRY SHERWOOD, OF HEBRON, INDIANA.

ANCHOR FOR DREDGING-MACHINES.

SPECIFICATION forming part of Letters Patent No. 762,950, dated June 21, 1904.

Application filed April 28, 1903. Serial No. 154,715. (No model.)

*To all whom it may concern:*

Be it known that I, JERRY SHERWOOD, a citizen of the United States, residing at Hebron, in the county of Porter and State of Indiana, have invented certain new and useful Improvements in Anchors for Dredging-Machines, of which the following is a specification.

My invention relates to devices for anchoring dredges, ditching-machines, &c., and has for its object to provide a device that will automatically lock the machine and prevent its oscillation or side sway.

My invention consists, essentially, of two braces pivotally mounted on stable supports on each side of the dredge or ditching-machine having thereon a sliding catch to intermember with ratchets having peculiarly-formed teeth, said ratchets being mounted on a framework erected on the machine.

The construction and operation of my invention will more fully appear hereinafter and by reference to the accompanying drawings, in which—

Figure 1 is an end view of a dredging-machine, showing my invention in position; Fig. 2, a top plan view; Fig. 3, a detail view of one of the ratchets, and Fig. 4 a detail view of one of the sliding catches.

Referring to the drawings, in which similar reference characters indicate corresponding parts throughout the several views, A represents the hull of a dredging-machine having erected thereon a framework consisting of two uprights B at each side of the dredge, connected by horizontal beams C, braced in their centers by block D.

E represents a plate secured to each end of each beam C, having formed therein ratchet-teeth consisting of a slanting edge F toward the outside of the dredge, an enlarged circular portion G, and an overhanging point H.

I represents a platform or pedestal erected on each side of the dredge, it being understood that if the machine is working in a narrow ditch, as shown in Fig. 1, the platforms may be erected on the ground on each side of the ditch; but when the machine is working in a broader expanse of water either or both platforms may be erected in the water or be mounted on anchored floats.

J represents upright studs pivoted on the hull A, K a beam secured near the upper end of each stud J and pivotally mounted on platforms I, and L a horizontal beam connecting stud J and beam K near their lower ends, this structure forming the anchor-frame.

M represents a guide consisting of a strip of metal having its ends bent to form angular rests that are secured to the upper end of stud J, and N represents a catch slidably mounted in said guide, consisting of a U-shaped slide O, mounted on said guide M, through the ends of which is inserted a bar P, that rides in the slot Q, formed by angular guide M and the side of stud J.

It will be understood from this description that as the hull A rocks with the swing of the crane of the dredging apparatus the bar P on the stud J on the side of the hull that is raised will slide up the slanting edge F of the teeth on plates E and will settle into one of the circular portions G as the hull rights itself, this operation continuing until the studs are positioned relative to the plates E and the dredge to prevent the hull dipping as the crane swings. It will be understood that in operating in tide-waters my invention will allow an automatic adjustment of the dredge and anchors during flood-tide, while at the ebb it will be necessary to raise the catch N out of engagement with the ratchet-teeth in plate E to allow the hull of the dredge to settle. In order to raise said catch N, I provide a rope R, secured to the ends of bar P and running over a sheave S, journaled in the top of stud J.

Having thus described my invention, what I claim is—

1. In an anchor for dredging-machines, triangular frames pivoted on the machine, means to pivotally secure said triangular frames outside of said machine, and pawls and ratchets connecting said frames with the machine, substantially as shown and described.

2. In an anchor for dredging-machines, a platform erected on each side of the machine, a triangular frame pivoted on the machine and on each platform, and a pawl and ratchet connecting said frame and the machine, substantially as shown and described.

3. In an anchor for dredging-machines, triangular frames pivoted on the machine, means to pivotally secure said triangular frames outside of said machine, ratchet-plates rigidly secured to said machine, and a sliding pawl on each triangular frame to intermember with the teeth on said plates, substantially as shown and described.

4. In an anchor for dredging-machines, a platform erected on each side of the machine, a triangular frame pivoted on the machine and on each platform, ratchet-plates rigidly secured to said machine, and a sliding pawl on each triangular frame to intermember with the teeth on said plates, substantially as shown and described.

5. In an anchor for dredging-machines, a platform erected on each side of the machine, a framework erected on the hull of the machine, ratchet-plates secured to said framework having teeth with slanting faces on the inner side thereof, the other side of the teeth having overhanging points, a triangular frame pivoted on each side of the hull of the machine and on each platform, and a sliding pawl mounted on each triangular frame to intermember with the teeth of the ratchet-plate aforesaid, substantially as shown and described.

In testimony whereof I hereto affix my signature in the presence of two witnesses.

JERRY SHERWOOD.

Witnesses:
  JOHN MORROW,
  O. A. WHARTON.